(12) United States Patent
Cochrane et al.

(10) Patent No.: US 12,202,543 B2
(45) Date of Patent: Jan. 21, 2025

(54) MODULAR PICK-UP TRUCK CHASSIS FRAME STRUCTURE THAT MAXIMIZES THE RECHARGEABLE ENERGY STORAGE SYSTEM PACKAGE VOLUME FOR BODY-ON-FRAME BATTERY ELECTRIC VEHICLE ARCHITECTURES INTRODUCTION

(71) Applicants: GM GLOBAL TECHNOLOGY OPERATIONS LLC, Detroit, MI (US); MAGNA INTERNATIONAL INC., Troy, MI (US)

(72) Inventors: David C. Cochrane, Oshawa (CA); Joseph M. Madafferi, South Lyon, MI (US); Steven Blokker, Ancaster (CA); Sunny Kharbanda, Rochester Hills, MI (US); Mark Chrz, Southfield, MI (US); Abelardo Estrada, Rochester Hills, MI (US); Jason Kelley, Grand Blanc, MI (US); Douglas Alan Roy, Ingersoll (CA); Raymond Scrimgeour, Dorchester (CA)

(73) Assignees: GM GLOBAL TECHNOLOGY OPERATIONS LLC, Detroit, MI (US); MAGNA INTERNATIONAL INC., Washington, DC (US)

( * ) Notice: Subject to any disclaimer, the term of this patent is extended or adjusted under 35 U.S.C. 154(b) by 282 days.

(21) Appl. No.: 17/854,523

(22) Filed: Jun. 30, 2022

(65) Prior Publication Data
US 2024/0001991 A1    Jan. 4, 2024

(51) Int. Cl.
*B62D 21/15*    (2006.01)
*B60K 1/04*    (2019.01)
(Continued)

(52) U.S. Cl.
CPC .............. *B62D 21/152* (2013.01); *B60K 1/04* (2013.01); *B62D 21/02* (2013.01); *B62D 21/09* (2013.01);
(Continued)

(58) Field of Classification Search
CPC .............. B60K 2001/0438; B60K 1/04; B60K 2001/0405; B62D 21/09; B62D 21/152; B62D 21/02; B62D 21/14
See application file for complete search history.

(56) References Cited

U.S. PATENT DOCUMENTS 1,119,106 A * 12/1914 Morse ................... B62D 53/061
                                                                    280/102
1,422,034 A *  7/1922 Collier ................... B62D 21/02
                                                                    267/229

(Continued)

FOREIGN PATENT DOCUMENTS

AT        160682 B    11/1941
DE      4322717 A1     1/1995
(Continued)

OTHER PUBLICATIONS

German Office Action from counterpart DE1020221281329, dated Oct. 18, 2024.

*Primary Examiner* — Timothy Wilhelm (57) ABSTRACT

A vehicle frame structure including a pair of elongated mid bay rails with a cross beam extending between rear ends of the pair of mid bay rails. A pair of elongated rear bay rails define an overlapping joint with the pair of elongated mid bay rails, wherein a first pair of reinforcement members connect forward ends of the pair of rear bay rails to the pair of elongated mid bay rails and a second pair of reinforcement members connect rearward ends of the pair of mid bay rails to the pair of elongated rear bay rails.

17 Claims, 6 Drawing Sheets

(51) Int. Cl.
*B62D 21/02* (2006.01)
*B62D 21/09* (2006.01)

(52) U.S. Cl.
CPC ............. *B60K 2001/0405* (2013.01); *B60K 2001/0438* (2013.01)

(56) References Cited

U.S. PATENT DOCUMENTS

| | | | | |
|---|---|---|---|---|
| 2,002,851 | A | 5/1935 | Divney | |
| 2,277,616 | A * | 3/1942 | Townsend | B62D 63/068 52/837 |
| 2,722,433 | A * | 11/1955 | Shinn | B62D 53/061 414/537 |
| 2,794,650 | A * | 6/1957 | Schilberg | B62D 21/18 296/204 |
| 3,986,726 | A * | 10/1976 | Vos | B62D 53/061 280/441.2 |
| 4,618,163 | A * | 10/1986 | Hasler | B62D 23/005 296/205 |
| 5,114,183 | A * | 5/1992 | Haluda | B60G 15/06 D34/24 |
| 5,411,308 | A * | 5/1995 | Kreis | B62D 29/008 296/205 |
| 6,299,210 | B1 * | 10/2001 | Ruehl | B62D 21/02 280/800 |
| 7,389,844 | B2 * | 6/2008 | Van Der Bijl | B62D 21/02 180/312 |
| 7,887,093 | B2 * | 2/2011 | Pitsenbarger | B62D 21/02 280/798 |
| 8,474,871 | B1 | 7/2013 | Ludwick | B62D 21/09 280/789 |
| 8,672,354 | B2 * | 3/2014 | Kim | B62D 21/10 280/783 |
| 8,863,877 | B2 * | 10/2014 | Saeki | H01M 50/249 180/274 |
| 9,027,684 | B2 * | 5/2015 | Araki | B60K 1/04 180/311 |
| 9,422,015 | B1 * | 8/2016 | Fraley | B62D 21/09 |
| 9,446,801 | B1 * | 9/2016 | Oren | B62D 53/06 |
| 9,950,747 | B2 * | 4/2018 | Mashio | B60R 19/04 |
| 10,112,470 | B2 * | 10/2018 | Hamilton | B62D 25/20 |
| 10,112,541 | B2 * | 10/2018 | Portney | B62D 47/02 |
| 10,124,832 | B2 * | 11/2018 | Tsumiyama | B62D 21/183 |
| 10,497,998 | B2 * | 12/2019 | Milton | H01M 10/6557 |
| 10,518,828 | B2 * | 12/2019 | Oren | B62D 53/061 |
| 10,583,746 | B2 * | 3/2020 | Ogaki | H01M 10/625 |
| 10,647,359 | B2 * | 5/2020 | Viaux | B62D 65/02 |
| 10,766,347 | B2 * | 9/2020 | Iwasa | H01M 50/244 |
| 11,167,804 | B2 * | 11/2021 | Kim | B62D 27/023 |
| 11,254,369 | B2 * | 2/2022 | Kim | B62D 27/023 |
| 11,325,453 | B2 * | 5/2022 | Friedman | H01M 50/249 |
| 11,667,182 | B2 * | 6/2023 | Woo | B60K 1/04 180/68.5 |
| 11,745,635 | B2 * | 9/2023 | Burke | B62D 63/08 296/184.1 |
| 11,753,083 | B2 * | 9/2023 | Ernst | B62D 27/023 296/203.01 |
| 11,926,364 | B2 * | 3/2024 | Kim | B62D 21/12 |
| 11,938,804 | B2 * | 3/2024 | Andersson | B60K 1/04 |
| 12,005,958 | B2 * | 6/2024 | Grinstead | B62D 21/12 |
| 2006/0108784 | A1 * | 5/2006 | Van Der Bijl | B62D 21/02 280/789 |
| 2006/0219462 | A1 * | 10/2006 | Martin | B62D 21/02 180/292 |
| 2008/0067796 | A1 * | 3/2008 | Pitsenbarger | B62D 21/02 280/790 |
| 2008/0284151 | A1 * | 11/2008 | Mandel | B62D 21/152 280/781 |
| 2011/0001337 | A1 * | 1/2011 | Patschicke | B62D 25/2027 296/193.07 |
| 2012/0193891 | A1 * | 8/2012 | Wu | B62K 5/007 292/334 |
| 2013/0175829 | A1 * | 7/2013 | Kim | B60L 50/64 296/204 |
| 2021/0024131 | A1 * | 1/2021 | Baccouche | B62D 21/15 |
| 2022/0105799 | A1 * | 4/2022 | Bochicchio De Maria | B60K 15/07 |
| 2024/0123808 | A1 * | 4/2024 | Hausler | H01M 50/204 |

FOREIGN PATENT DOCUMENTS

| | | |
|---|---|---|
| DE | 10140921 A1 | 3/2003 |
| DE | 10335031 A1 | 2/2005 |
| DE | 102008056406 A1 | 5/2010 |
| DE | 102021111352 A1 | 11/2021 |

* cited by examiner

MODULAR PICK-UP TRUCK CHASSIS FRAME STRUCTURE THAT MAXIMIZES THE RECHARGEABLE ENERGY STORAGE SYSTEM PACKAGE VOLUME FOR BODY-ON-FRAME BATTERY ELECTRIC VEHICLE ARCHITECTURES INTRODUCTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Existing pick-up truck chassis frame structures have limited rechargeable energy storage system package volume due to a transition zone between the mid bay rails and the rear bay rails limiting a length of the rechargeable energy storage system package volume.

The present disclosure relates to a modular pick-up truck chassis frame structure that maximizes the rechargeable energy storage system package volume for body on frame electric vehicle architectures.

SUMMARY

A vehicle frame structure including a pair of elongated mid bay rails with a cross beam extending between rear ends of the pair of mid bay rails. A pair of elongated rear bay rails define an overlapping joint with the pair of elongated mid bay rails, wherein a first pair of reinforcement members connect forward ends of the pair of rear bay rails to the pair of elongated mid bay rails and a second pair of reinforcement members connect rearward ends of the pair of mid bay rails to the pair of elongated rear bay rails.

According to a further aspect of the present disclosure, the first pair of reinforcement members and the second pair of reinforcement members are welded to the pair of elongated mid bay rails and the pair of elongated rear bay rails.

According to another aspect of the present disclosure, the first pair of reinforcement members and the second pair of reinforcement members extend outboard from the pair of elongated rear bay rails to the pair of elongated mid bay rails.

According to a further aspect of the present disclosure, the first pair of reinforcement members and the second pair of reinforcement members are connected to a side surface of the elongated rear bay rails and a top surface of the elongated mid bay rails.

According to a further aspect of the present disclosure, the first pair of reinforcement members include a mounting portion disposed on a top surface of the elongated mid bay rails and overlapping top portions of at least one side surface of the elongated mid bay rails.

According to a further aspect of the present disclosure, ends of the pair of elongated mid bay rails are enclosed by the second pair of reinforcement members.

According to a further aspect of the present disclosure, the second pair of reinforcement members are welded to the pair of elongated rear bay rails.

According to a further aspect of the present disclosure, a rechargeable energy storage chamber is between the pair of elongated mid bay rails that extends rearward, in a vehicle traveling direction, of the first pair of reinforcement members, and including a plurality of battery cells within the rechargeable energy storage chamber.

According to a further aspect of the present disclosure, the rechargeable energy storage chamber is disposed directly between the pair of elongated rear bay rails.

According to a further aspect of the present disclosure, an intermediate cross beam extends between the pair of mid bay rails and a third pair of reinforcement members are connected between the intermediate cross beam and a forward end of the pair of rear bay rails.

A vehicle frame structure including a pair of elongated mid bay rails with a cross beam extending between rear ends of the pair of mid bay rails. A pair of elongated rear bay rails defining an overlapping joint with the pair of elongated mid bay rails, wherein a first pair of reinforcement members connect forward ends of the pair of rear bay rails to the pair of elongated mid bay rails and a second pair of reinforcement members connect rearward ends of the pair of mid bay rails to the pair of elongated rear bay rails. The first pair of reinforcement members and the second pair of reinforcement members are welded to the pair of elongated mid bay rails and the pair of elongated rear bay rails.

A vehicle frame structure including a pair of elongated mid bay rails with a rear cross beam extending between rear ends of the pair of mid bay rails. An intermediate cross beam extending between the pair of mid bay rails. A pair of elongated rear bay rails defining an overlapping joint with the pair of elongated mid bay rails, wherein a first pair of reinforcement members connect forward ends of the pair of rear bay rails to the pair of elongated mid bay rails and a second pair of reinforcement members connect rearward ends of the pair of mid bay rails to the pair of elongated rear bay rails. A third pair of reinforcement members connected between the intermediate cross beam and a forward end of the pair of rear bay rails. A rechargeable energy storage chamber between the pair of elongated mid bay rails that extends rearward, in a vehicle traveling direction, of the first pair of reinforcement members and a plurality of battery cells are disposed within the rechargeable energy storage chamber.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

With reference to FIGS. 1-3 and 5, a portion of a pick-up truck chassis frame structure 10 is shown. The pick-up truck frame structure 10 typically includes a front bay section (not shown), a mid bay section 12 and a rear bay section 14. A front suspension system is typically mounted to the front bay section and a rear suspension system is typically mounted to the rear bay section 14 for supporting a rear axle along the line X, shown in FIG. 3.

The mid bay section 12 includes a pair of elongated mid bay rails 16 that are connected by a rear cross beam 18 and an intermediate cross beam 20 that can each be received in a pair of corresponding apertures 18a, 20a in the pair of elongated mid bay rails 16 and welded thereto. Additional bridge braces 22 can be connected to an upper surface of the mid bay rails 16 by brackets 24 that are connected to the elongated mid bay rails 16 by welding or other fastening techniques.

Figure 9:
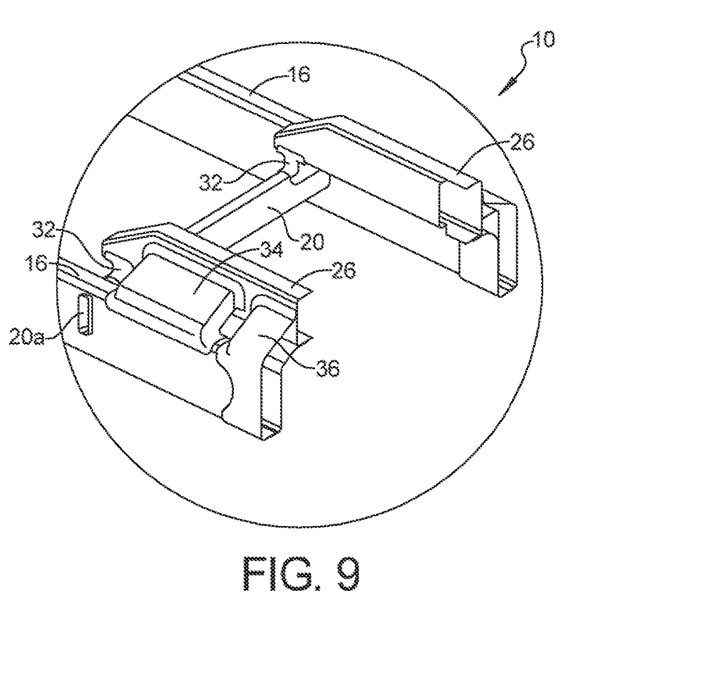
FIG. 9 is a detailed rear perspective view of a portion of the pick-up truck chassis frame structure.
Figure 10:
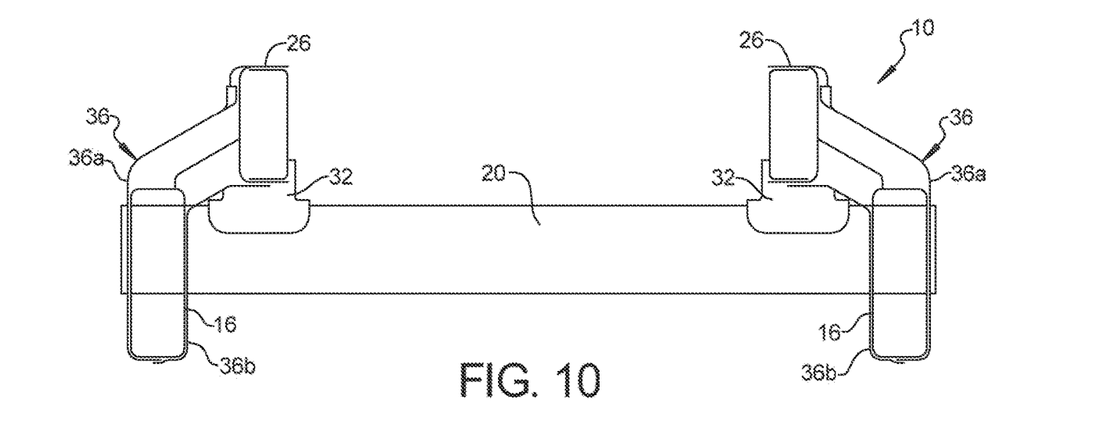
FIG. 10 is a cross-sectional view of a portion of the pick-up truck chassis frame structure.

A rear bay section 14 includes a pair of elongated rear bay rails 26 that define an overlapping joint region 30 with the pair of elongated mid bay rails 16. As best shown in FIGS. 9 and 10, the overlapping joint region 30 includes a pair of first mounting brackets 32 that are welded to a forward end of the elongated rear bay rails 26 and to the intermediate cross beam 20.

The overlapping joint region 30 further includes a pair of second mounting brackets 34 that are welded to the elongated rear bay rails 26 and the elongated mid bay rails 16. The pair of second mounting brackets are welded to a side surface of the elongated rear bay rails 26 and are welded to a top and a side surface of the mid bay rails 16.

The overlapping joint region 30 further includes a pair of third mounting brackets 36 that are welded to the elongated rear bay rails 26 and the elongated mid bay rails 16. The pair of third mounting brackets 36 can be welded to a side surface and a bottom surface of the elongated rear bay rails 26 and welded to and enclose a rear end of the mid bay rails 16.

Figure 7:
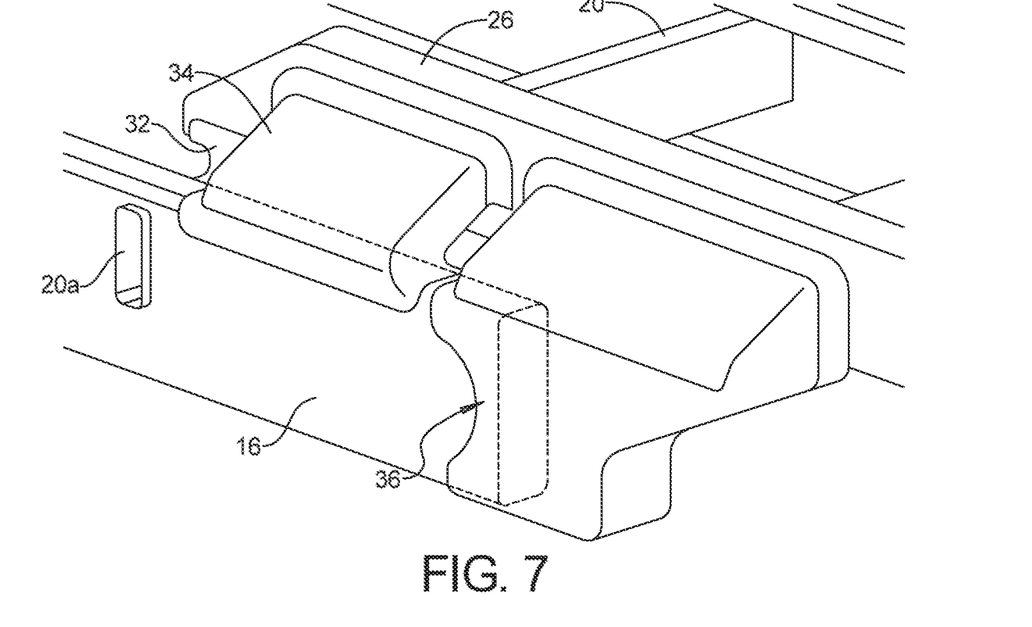
FIG. 7 is a detailed rear perspective view of a portion of the pick-up truck chassis frame structure.
Figure 8:
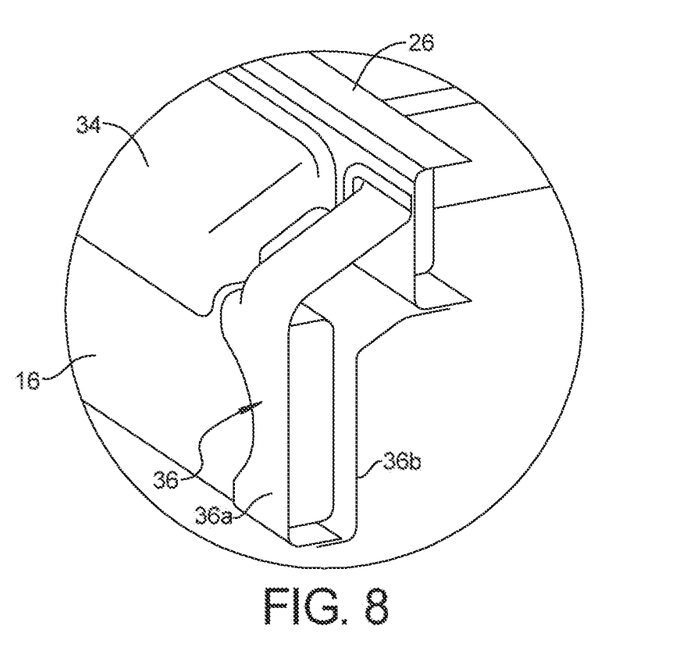
FIG. 8 is a partial cut-away perspective view of a portion of the pick-up truck chassis frame structure.

With reference to FIGS. 7 and 8, the pair of third mounting brackets 36 can include an upper bracket portion 36A that is welded to a side surface of the elongated rear bay rails 26, extends outboard and around an outer surface of the elongated mid bay rails 16 and is welded to a bottom surface of the pair of elongated mid bay rails 16. A lower bracket portion 36B of the pair of third mounting brackets 36 is welded to a bottom surface of the rear end of the mid bay rails 16 and a extends inboard and upward where it is welded to bottom surface of the pair of rear bay rails 26. The upper and lower bracket portions 36A, 36B of the third mounting brackets 36 enclose the rear end of the mid bay rails 16.

Figure 6:
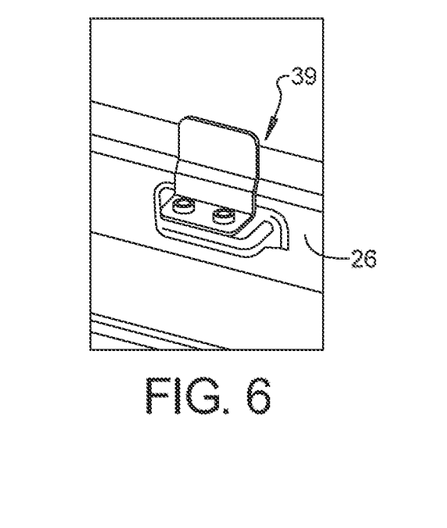
FIG. 6 is a perspective view of an upfitter attachment on the side of an upper rear rail.

A plurality of additional cross beams 38 can extend between the pair of elongated rear bay rails 26. With reference to FIG. 6, additional body mounting structures such as an upfitter attachment 39 can be attached to the mid bay rails 16 and the rear bay rails 26.

A rechargeable energy storage chamber 40 is defined between the elongated mid bay rails 16 and extends to a location just forward of the rear cross beam 18. Additionally, the rechargeable energy storage chamber 40 can be provided between the rear bay rails 26 within the overlapping joint region 30. The modular pick-up truck chassis frame structure 10 maximizes rechargeable energy storage chamber 40 package volume for body on frame battery electric vehicle architectures by allowing the rechargeable energy storage chamber 40 to extend to the rear of the mid bay rails 16 and between the rear bay rails 26 within the overlapping joint region 30. A plurality of battery cells 42 (only a few are shown) are disposed within the rechargeable energy storage chamber 40.

Figure 1:
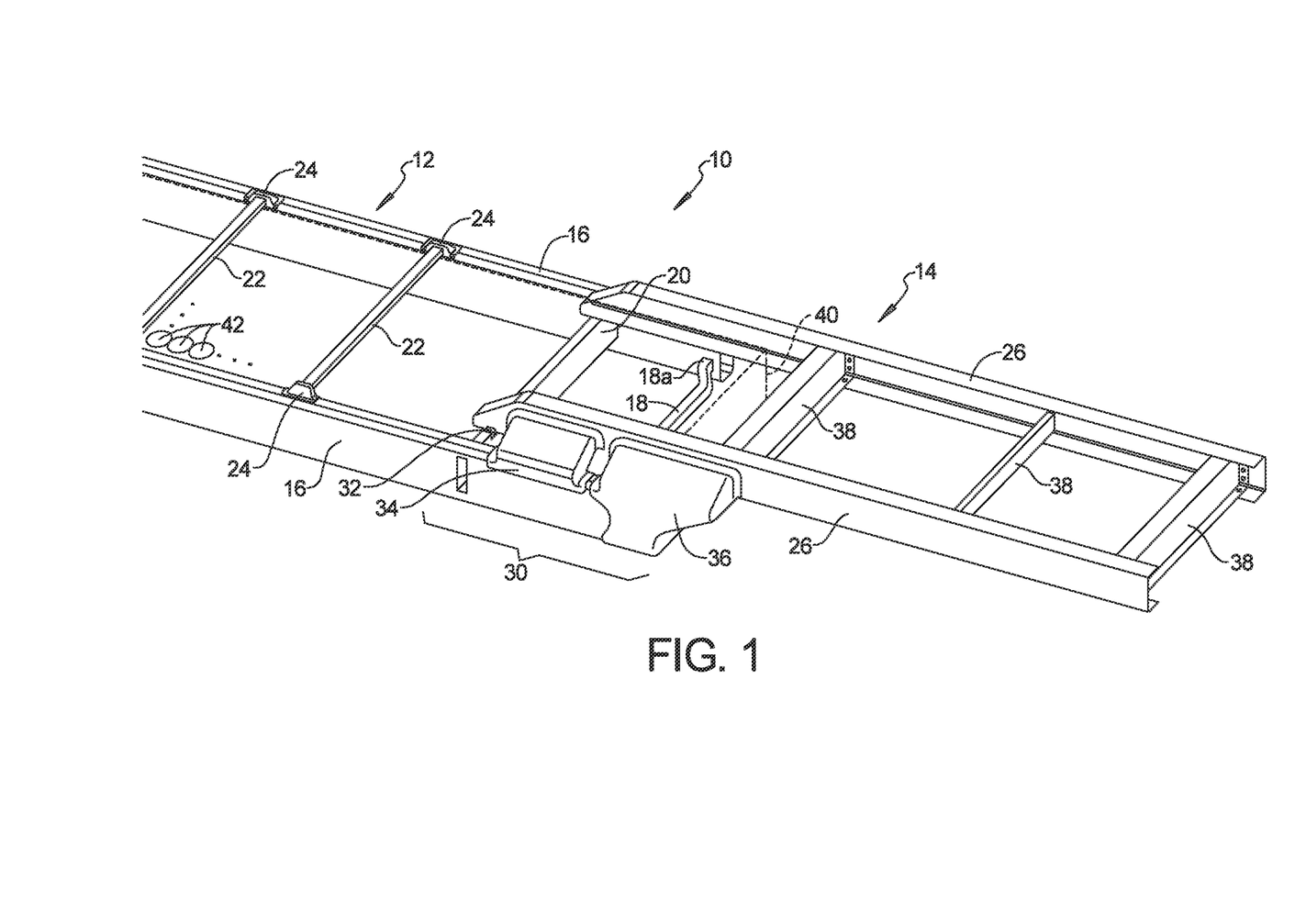
FIG. 1 is a rear perspective view of portion of a pick-up truck chassis frame structure according to the principles of the present disclosure.
Figure 2:
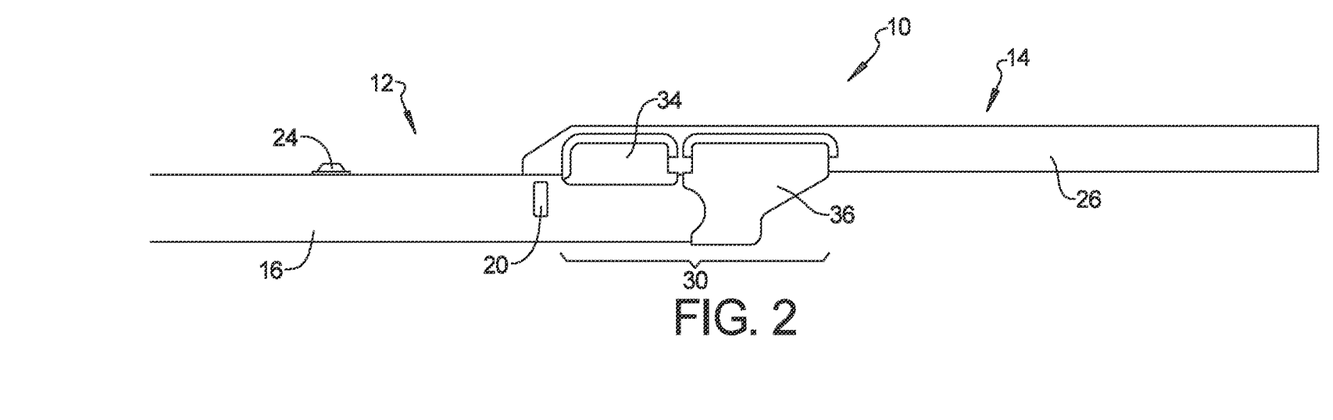
FIG. 2 is a side plan view of a portion of the pick-up truck chassis frame structure.
Figure 3:
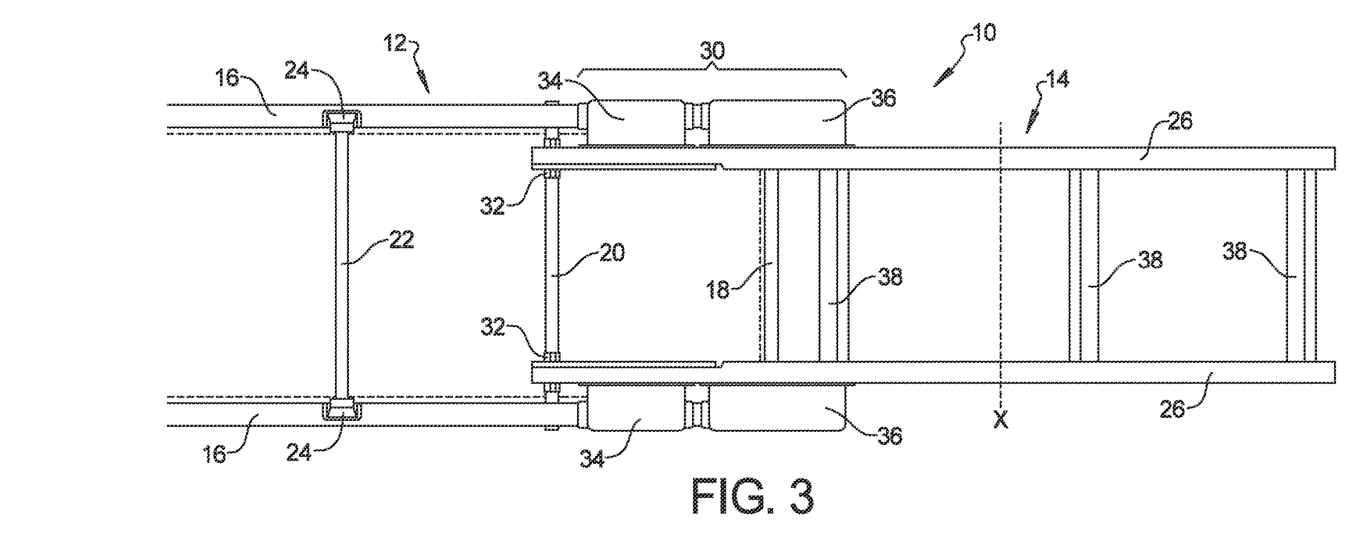
FIG. 3. Is a top plan view of a portion of the pick-up truck chassis frame structure.
Figure 4:
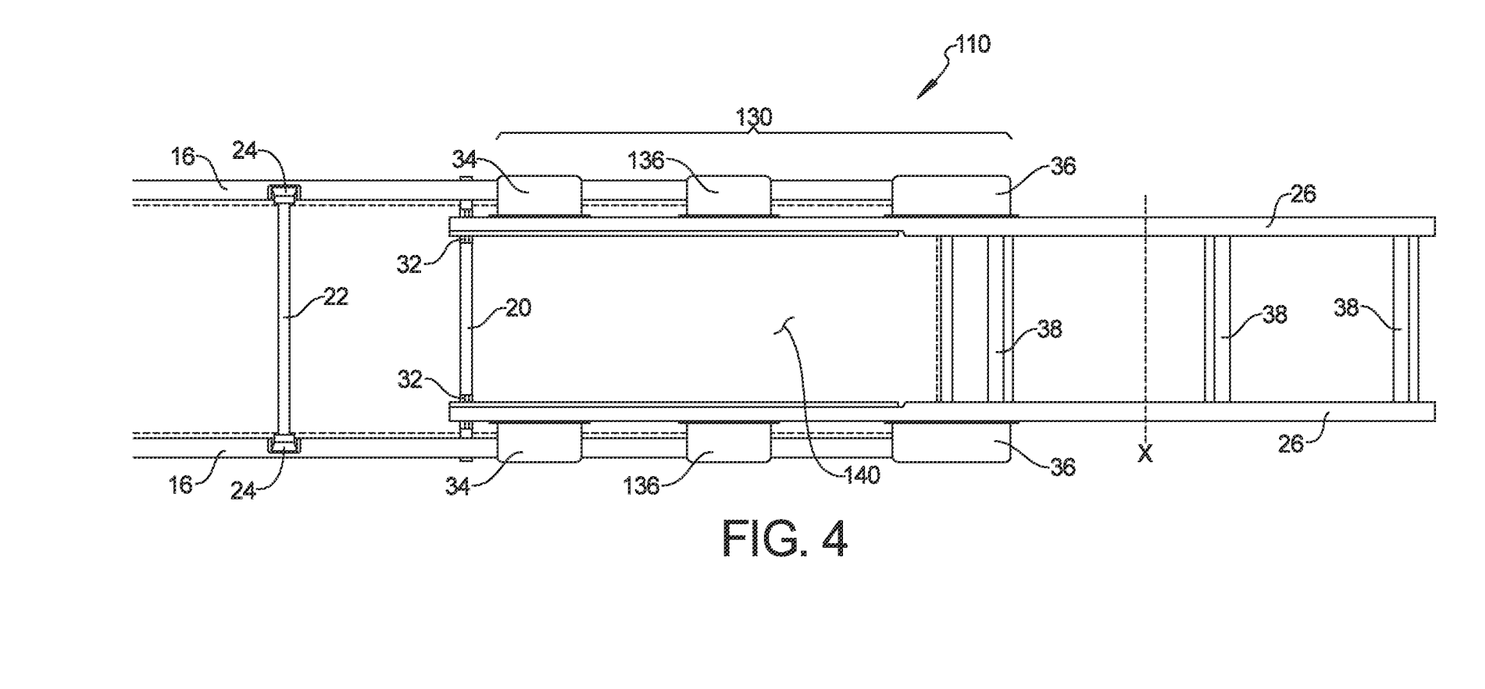
FIG. 4 is a top plan view of a portion of a pick-up chassis frame having a long wheelbase.
Figure 5:
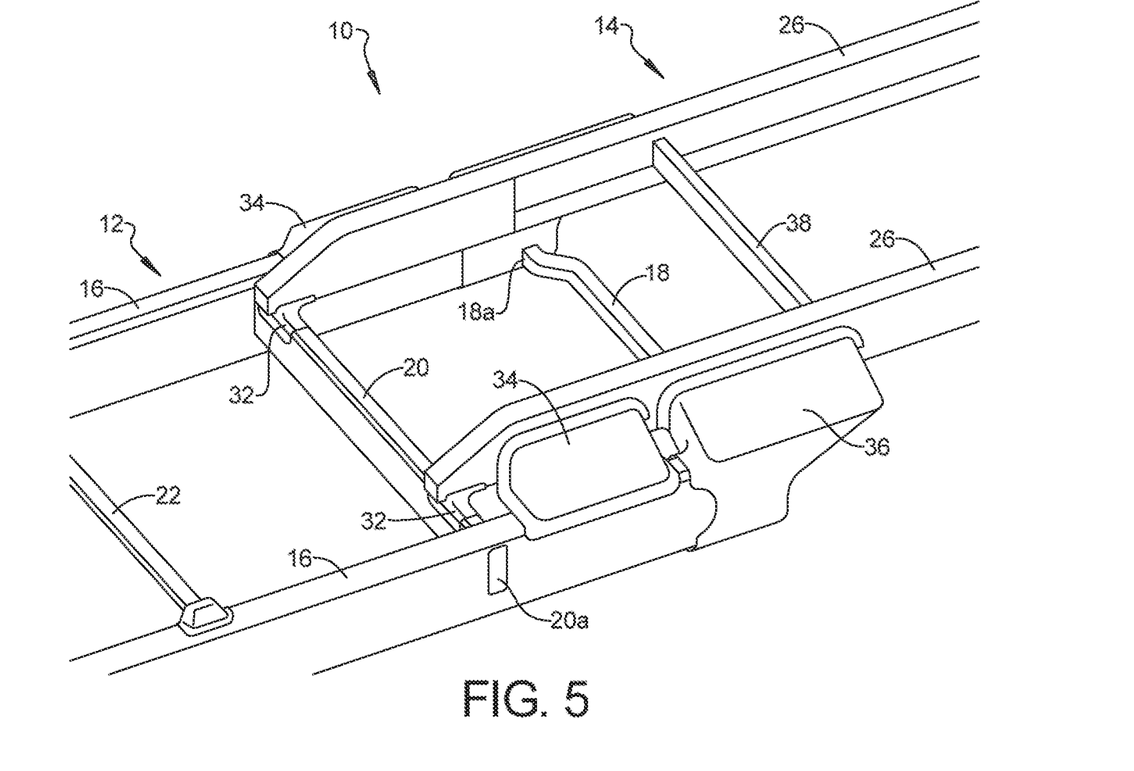
FIG. 5 is a front perspective view of a portion of the pick-up truck chassis frame structure.

With reference to FIG. 4, a portion of an elongated wheel base pick-up truck chassis frame structure 110 is shown. In the elongated wheel base pick-up truck chassis frame structure 110 embodiment of FIG. 4, the overlapping joint region 130 can be extended and include an additional pair of fourth mounting brackets 136 that are welded to the elongated rear bay rails 26 and the elongated mid bay rails 16. The pair of fourth mounting brackets 136 are welded to a side surface of the elongated rear bay rails 26 and are welded to a top and a side surface of the mid bay rails 16. The rechargeable energy storage chamber 140 of the elongated wheel base pick-up truck chassis frame structure 110 can be lengthened with the wheel base.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," next to, "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A vehicle frame structure, comprising:
   a pair of elongated mid bay rails that have forward and rearward ends;

a rear cross beam extending between the rearward ends of the pair of elongated mid bay rails;
a pair of elongated rear bay rails having front ends and rear ends, the front ends of the pair of elongated rear bay rails defining an overlapping joint with the rearward ends of the pair of elongated mid bay rails, the overlapping joint having a first end and a second end, with a spacing between the pair of elongated rear bay rails being narrower than a spacing between the pair of elongated mid bay rails;
an intermediate cross beam at the first end of the overlapping joint;
a pair of first mounting brackets fixed to the intermediate cross beam and connected to the front ends of each of the pair of elongated rear bay rails;
a pair of second mounting brackets extending outboard from the pair of elongated rear bay rails at an area between the intermediate cross beam and the second end of the overlapping joint and connected to the elongated mid bay rails; and
a pair of third mounting brackets at the rearward ends of the pair of elongated mid bay rails, wherein the pair of third mounting brackets are connected to, encapsulate, and support the rearward ends of the elongated mid bay rails and extend inboard to connect to the elongated rear bay rails.

2. The vehicle frame structure according to claim 1, wherein the pair of first mounting brackets, the pair of second mounting brackets, and the pair of third mounting brackets are welded to at least one of the intermediate cross beam, the elongated mid bay rails, and the elongated rear bay rails.

3. The vehicle frame structure according to claim 1, wherein the pair of second mounting brackets and the pair of third mounting brackets extend outboard from the pair of elongated rear bay rails to the pair of elongated mid bay rails.

4. The vehicle frame structure according to claim 1, wherein the pair of second mounting brackets and the pair of third mounting brackets are connected to a side surface of the elongated rear bay rails.

5. The vehicle frame structure according to claim 1, wherein the pair of second mounting brackets include a mounting portion disposed on a top surface of the elongated mid bay rails and overlapping top portions of at least one side surface of the elongated mid bay rails.

6. The vehicle frame structure according to claim 1, wherein the pair of third mounting brackets are welded to the pair of elongated rear bay rails.

7. The vehicle frame structure according to claim 1, further comprising a rechargeable energy storage chamber between the pair of elongated mid bay rails that extends rearward, in a vehicle traveling direction, the pair of first mounting brackets, and including a plurality of battery cells within the rechargeable energy storage chamber.

8. The vehicle frame structure according to claim 7, wherein the rechargeable energy storage chamber is disposed directly between the pair of elongated rear bay rails.

9. A vehicle frame structure, comprising:
a pair of elongated mid bay rails that have forward and rearward ends;
a rear cross beam extending between the rearward ends of the pair of elongated mid bay rails;
a pair of elongated rear bay rails having front ends and rear ends, the front ends of the pair of elongated rear bay rails defining an overlapping joint with the rearward ends of the pair of elongated mid bay rails, the overlapping joint having a first end and a second end, with a spacing between the pair of elongated rear bay rails being narrower than a spacing between the pair of elongated mid bay rails;
an intermediate cross beam at the first end of the overlapping joint;
a pair of first mounting brackets welded to the intermediate cross beam and welded to the front ends of each of the pair of elongated rear bay rails;
a pair of second mounting brackets are welded to and extend outboard from the pair of elongated rear bay rails at an area between the intermediate cross beam and the second end of the overlapping joint welded to the elongated mid bay rails; and
a pair of third mounting brackets at the rearward ends of the pair of elongated mid bay rails, wherein the pair of third mounting brackets are welded to, encapsulate, and support the rearward ends of the elongated mid bay rails and extend inboard to connect to the elongated rear bay rails.

10. The vehicle frame structure according to claim 9, wherein the pair of second mounting brackets and the pair of third mounting brackets extend outboard from the pair of elongated rear bay rails to the pair of elongated mid bay rails.

11. The vehicle frame structure according to claim 9, wherein the pair of second mounting brackets and the pair of third mounting brackets are connected to a side surface of the elongated rear bay rails.

12. The vehicle frame structure according to claim 9, wherein the pair of second mounting brackets include a mounting portion disposed on a top surface of the elongated mid bay rails and overlapping top portions of at least one side surface of the elongated mid bay rails.

13. The vehicle frame structure according to claim 9, wherein the rearward ends of the pair of elongated mid bay rails are enclosed with the pair of the third mounting brackets.

14. The vehicle frame structure according to claim 9, further comprising a rechargeable energy storage chamber between the pair of elongated mid bay rails that extends rearward, in a vehicle traveling direction, of the pair of first mounting brackets, and including a plurality of battery cells within the rechargeable energy storage chamber.

15. The vehicle frame structure according to claim 14, wherein the rechargeable energy storage chamber is disposed directly between the pair of elongated rear bay rails.

16. A vehicle frame structure, comprising:
a pair of elongated mid bay rails that have forward and rearward ends, the pair of elongated mid bay rails are parallel and spaced apart at a distance;
a rear cross beam extending between the rearward ends of the pair of the elongated mid bay rails;
a pair of elongated rear bay rails having front ends and rear ends, the pair of elongated rear bay rails are parallel and spaced apart at a distance that is narrower than the distance spacing the pair of elongated mid bay rails;
an overlapping joint with a first end and a second end defined by the pair of elongated rear bay rails front ends overlayed above the pair of elongated mid bay rails;
an intermediate cross beam at the first end of the overlapping joint extending between the pair of elongated mid bay rails;
a pair of first mounting brackets fixed to the intermediate cross beam and connected to the front ends of each of the pair of elongated rear bay rails;

a pair of second mounting brackets extending outboard at an area between the intermediate cross beam and the second end of the overlapping joint connecting the elongated mid bay rails to the elongated rear bay rails;

a pair of third mounting brackets at the rearward ends of the mid bay rails, wherein the pair of third mounting brackets are connected to, encapsulate, and support the rearward ends of elongated mid bay rails and extend inboard to connect to the elongated rear bay rails;

a rechargeable energy storage chamber between the pair of elongated mid bay rails that extends rearward, in a vehicle traveling direction, of the pair of first mounting brackets; and a plurality of battery cells disposed within the rechargeable energy storage chamber.

17. The vehicle frame structure according to claim 16, wherein the rechargeable energy storage chamber is disposed directly between the pair of elongated rear bay rails.

* * * * *